United States Patent [19]

Pund et al.

[11] 4,427,274

[45] Jan. 24, 1984

[54] WIDE ANGLE PROJECTION SYSTEM

[75] Inventors: Marvin L. Pund, Bel Nor; John A. VanHoogstrate, Jr., St. Louis County, both of Mo.

[73] Assignee: McDonnell Douglas Corporation, St. Louis, Mo.

[21] Appl. No.: 254,417

[22] Filed: Apr. 15, 1981

[51] Int. Cl.³ .................. G03B 21/28; G03B 21/56
[52] U.S. Cl. .............................. 353/99; 353/94; 353/122
[58] Field of Search ............... 353/79, 98, 99, 121, 353/122, 11, 12, 13, 69; 350/9, 21, 27, 48, 55, 125, 441, 442, 17, 54; 352/69, 85; 434/30, 35, 38, 40, 43, 44, 286

[56] References Cited

U.S. PATENT DOCUMENTS

| 2,045,120 | 6/1936 | Carpenter | 353/99 |
|---|---|---|---|
| 3,620,592 | 11/1971 | Freeman | 434/44 |
| 3,880,509 | 4/1975 | Herndon | 353/79 |
| 3,895,861 | 7/1975 | Herndon | 434/44 X |
| 3,904,289 | 9/1975 | Yager | 350/27 |
| 3,998,532 | 12/1976 | Dykes | 350/441 |
| 4,009,929 | 3/1977 | Abe et al. | 350/35 |
| 4,167,311 | 9/1979 | Pund | 353/99 |
| 4,234,891 | 11/1980 | Beck et al. | 434/38 |
| 4,278,330 | 7/1981 | Buchroeder | 350/442 |
| 4,348,187 | 9/1982 | Dotsko | 353/99 X |

FOREIGN PATENT DOCUMENTS

| 1364060 | 5/1963 | France | 353/99 |
|---|---|---|---|
| 2448819 | 9/1980 | France | 434/40 |

Primary Examiner—Harry N. Haroian
Attorney, Agent, or Firm—Gravely, Lieder & Woodruff

[57] ABSTRACT

A projection system that is particularly suited for simulating aircraft flight includes a large dome and a projector and optical system that are located outside of the dome. The dome has a diffuse reflective surface that is presented inwardly. The projector produces a pattern of light which is redirected by the optical system such that it passes through an aperture in the dome, and is cast upon a wide area of the diffuse reflective surface as an image of a scene, particularly a scene that one might encounter from the cockpit of an aircraft. The optical system includes a concave mirror that is presented toward the aperture, a wide angle lens that is along the axis of the mirror, and a system of lens and folding mirrors for transmitting the light from the projector to the wide angle lens. The wide angle lens is located such that its pupil upon being reflected from the concave mirror reforms or comes into focus at the aperture in the dome. Thus, the light upon diverging from the wide angle lens reflects from the concave mirror and concentrates at the aperture through which it passes, diverging beyond the aperture to come into focus on the diffuse reflective surface, where it forms an image of the scene developed at the projector.

16 Claims, 3 Drawing Figures

WIDE ANGLE PROJECTION SYSTEM

BACKGROUND OF THE INVENTION

This invention relates in general to the projection of imagery and more particularly to a wide angle projection apparatus and process.

Flight simulation in order to be truly realistic, must have the flight scene that the pilot observes projected over an extremely wide area, which is usually a spherical surface that surrounds the cockpit from which the simulated flight is conducted. Normally, several projectors are used, some which are behind the spherical display surface and project their images through apertures in the surface, while others may be at the simulated cockpit beyond the view of the pilot. In any event, the use of several projectors substantially increases the cost of flight simulation because the projectors in themselves are extremely expensive and must be coordinated to provide a realistic composite. In this regard, the video ranges used in most flight simulators are derived from television cameras and are projected from light valve projectors which are considerably more expensive than the more common CRT projectors. Moreover, it is difficult to precisely merge the adjacent images cast by different projectors, and as a consequence highly visible lines of demarcation exist within the composite scene that is produced.

SUMMARY OF THE INVENTION

One of the principal objects of the present invention is to provide a projection system which is capable of projecting an image from a single projector into an extremely wide field so as to cover a very large display area with imagery. Another object is to provide a projection system of the type stated which lends itself to use with the obscuration system and process of U.S. Pat. No. 4,167,311. A further object is to provide a projection system of the type stated in which the light that forms the image conveyors to an extremely small area, so that the light may be projected through a relatively small aperture in a surface such as a screen or a wall. An additional object is to provide a projection system of the type stated which is particularly suitable for use in projecting the imagery for simulated flight. Still another object is to provide a projection system of the type stated that requires a relatively low capital investment and is inexpensive and simple to operate. Yet another object is to provide a projection system of the type stated that provides good resolution and little distortion over a wide area of the display surface. These and other objects and advantages will become apparent hereinafter.

The present invention is embodied in a projection system including a projector that is capable of emitting light in a desired pattern, a concave mirror, means for directing light from the projector to the mirror and for spreading the light onto the mirror such that the light is reflected back from the mirror and converges into a small area beyond the mirror, and a display surface located beyond the small area such that the image of the light pattern is cast on the display surface. The invention also resides in a process which involves producing light in a pattern, spreading the light from the pattern, reflecting the light from a concave mirror after it is spread, the reflection of the light being such that the light converges and thereafter diverges, and casting the light after it diverges onto a surface at which a real image is formed. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Figure 1:
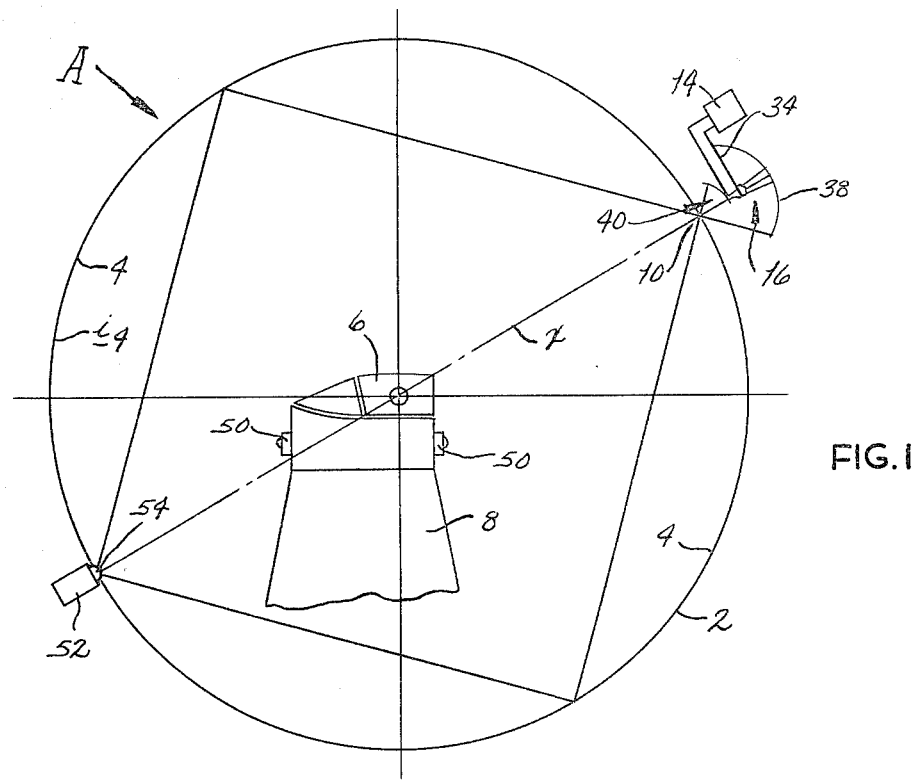
FIG. 1 is a sectional view of a wide angle projection system constructed in accordance with and embodying the present invention.

Referring now to the drawings, a projection apparatus or system A (FIG. 1) is in a broad sense suited for projecting imagery over a large display area, or more accurately into an extremely wide field. The large display surface should curve about the viewer, with a spherical configuration being preferred. In a narrower sense the projection system A is ideally suited for use in simulating flight, in which case the individual who conducts the simulated flight is located near the center of curvature for the display surface onto which the wide angle imagery is projected. The image is displayed with little distortion and a high degree of resolution.

The projection system A includes (FIG. 1) a hollow sphere or dome 2 having a diffuse reflective surface 4 that is presented inwardly. The surface 4 is spherical and has a relatively high degree of reflectivity. Typically, the surface 4 has a diameter of 20 to 40 feet. Mounted within the dome 2 is a simulated cockpit 6 which is supported on a pedestal 8 that extends upwardly from the bottom of the surface 4. The pedestal 8 positions the cockpit 6 such that the pilot who sits within the cockpit 6 to conduct a simulated flight has his head located generally at the center of the spherical surface 4. Directly to the rear of the simulated cockpit 6 and slightly above it, the dome 2 is provided with a circular aperture 10 which is quite small in that it usually need not be larger than about 0.75 inches in diameter. The image which is cast upon the surface to simulate flight is projected through the aperture 10. The light spreads broadly beyond the aperture 10, and comes into focus on the opposite portion of the diffuse reflective surface 2, forming a real image on that surface 2. This image covers about one hemisphere or more, with that hemisphere being generally the area of the surface 4 that is in front of the cockpit 6, above the cockpit 6, and to the sides of the cockpit 6. The cockpit 6 does, however, cast a shadow onto the area, but this shadow is located below and in front of the cockpit 6 in a region that is obscured by the cockpit 6 itself from the pilot's view. Thus, the pilot upon looking out of the cockpit 6 observes practically full hemisphere of imagery.

In addition, the projection system A includes (FIGS. 1 and 2) a projector 14 and a catadioptric optical system 16. The projector 14, of course, produces a light pattern and projects that pattern as a beam of light, the beam in this instance being collimated. The projector 14 may be a conventional movie projector, or in some instances even a slide projector. However, television systems are particularly suitable for flight simulation, so where the projection system A is part of a flight simulator, the projector 14 should be a CRT projector or a light valve projector, the latter being preferred because of the higher intensity of the illumination that it provides. In either case, the image that is ultimately projected is initially developed as a raster pattern t and leaves the projector 14 through a lens 18 that is constructed or adjusted to provide collimated light. Accordingly, the raster pattern t will come into focus at infinity. The optical system 16 collects the light rays emerging from the lens 18 of the projector 14, spreads them into wide angle imagery, which is in turn condensed and then projected through the aperture 10 in the surface 4 such that it comes into focus on the opposite portion of the reflective surface 4, casting an image that covers about a full hemisphere. The image is, of course, that of the raster pattern t developed in the light valve projector 14.

Figure 3:
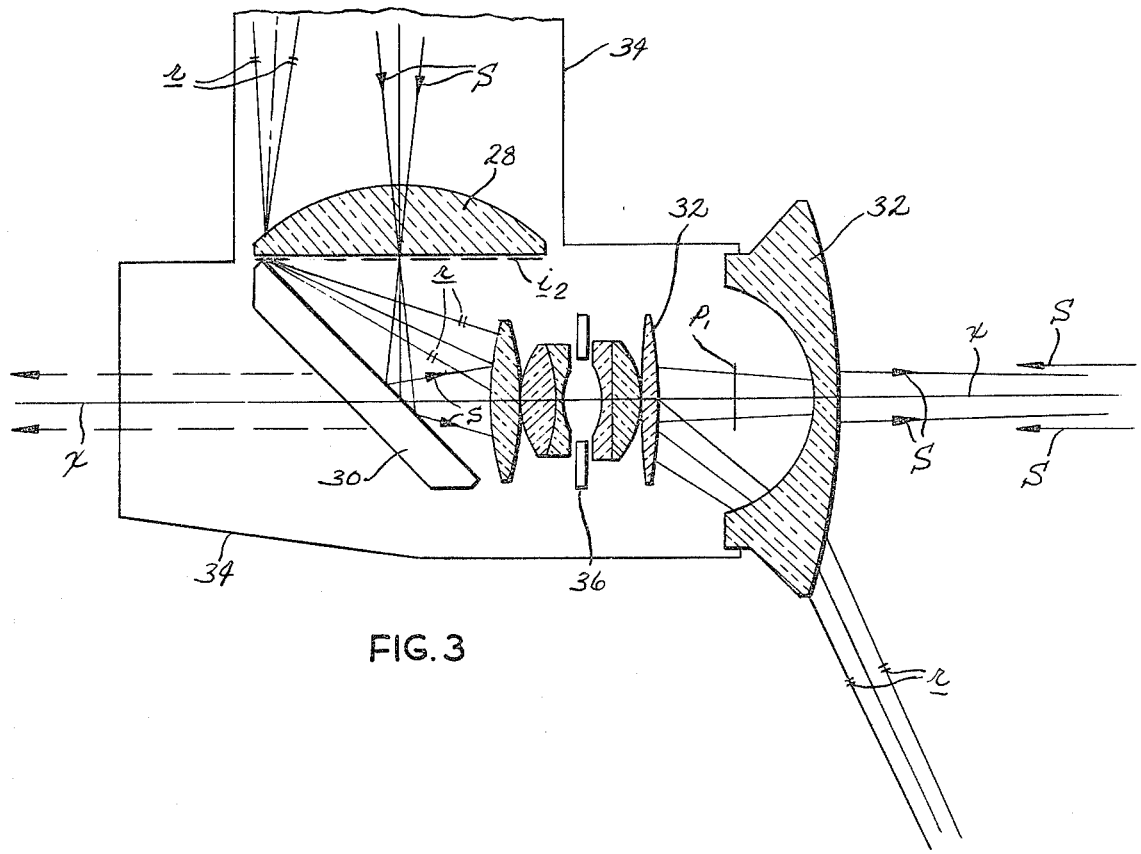
FIG. 3 is an enlarged sectional view of the wide angle lens of the optical system.
Figure 2:
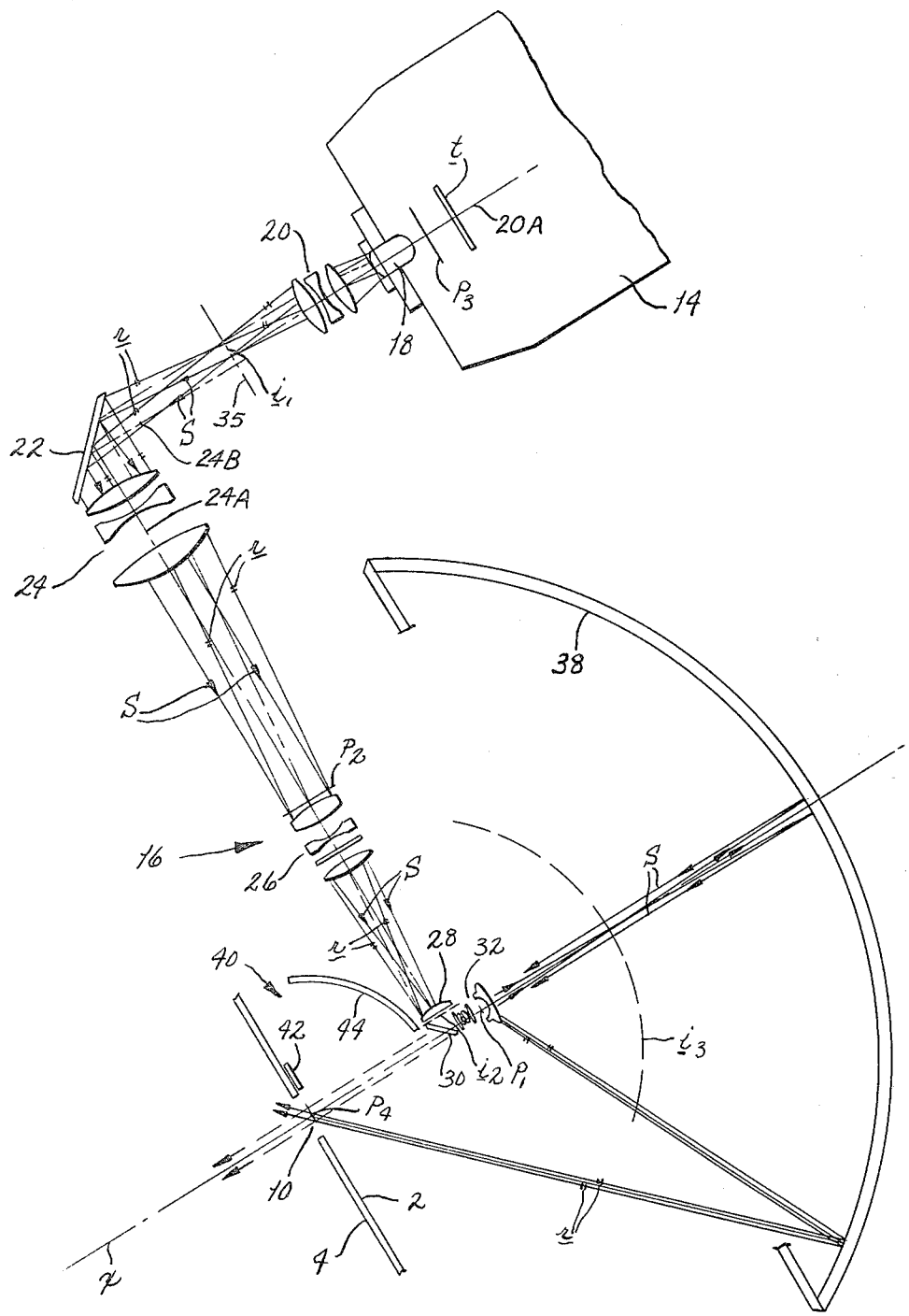
FIG. 2 is a sectional view of the optical system for the projection system, including its concave mirror.

The catadioptric optical system 16 includes (FIG. 2) a first relay lens 20, a planar folding mirror 22, a second relay lens 24, a third relay lens 26, a field lens 28, another planar folding mirror 30, and a wide angle lens 32, all arranged in that order from the projector 14. The arrangement of the system of lenses as seen in FIG. 2 places the wide angle lens 32 out of direct alignment with projector 14. The lenses 26, 28, and 32, and the mirrors 22 and 24 are all contained within a housing 34 (FIG. 3), that extends downwardly generally parallel to the back of the dome 2. The housing 34 positions the wide angle lens 32 such that its optical axis x is coincident with that radius of the reflective surface 4 which passes through the aperture 10 in the dome 2. That radius or line constitutes the principal optical axis x of the optical system 16. Each of the lenses 20, 24, 26 and 32 includes a plurality of lens elements, but even so all are conventional and therefore will not be described.

The first relay lens 20 is located immediately beyond the projector lens 18 such that it collects all of the collimated light from that lens. The lens 20 brings this light into focus before the mirror 22 so as to produce a first real image $i_1$ that is planar. In other words, all of the rays emanating from any one point on the raster pattern t will intersect at the location of the real image $i_1$, so at that location one could obtain an actual image of the raster pattern t. At the image $i_1$ is an image mask 35 having a circular opening, the center of which lies along the common optical axis of the lenses 18 and 20.

The raster pattern t is rectangular and the first projector lens 18 and the first relay lens 20 are large enough to transmit light emanating from the entire raster pattern t. The first folding mirror 22 folds the optical axis so the light is redirected generally parallel to the back surface of the dome 2. Beyond the folding mirror 22 the light enters the second relay lens 24 which is positioned such that its centerline or axis 24a when projected rearwardly along line 24B from the mirror 22 toward the projector 14 is offset from the centerline or axis 20a of the first relay lens 20 and the mask 35. This offset facilitates optimum usage of the rectangular raster pattern t. More specifically, the image $i_1$ is exactly as wide as the circular opening in the mask 35. The offset positions the top of the raster image $i_1$ at the top edge of the opening in the mask 35. However, an area at the bottom of the projected field will not be filled with raster imagery. This is of little significance since when the light is ultimately projected onto the diffuse reflective surface 4 of the dome 2, this portion of the raster is at the bottom of the projected image where it is not observed by the pilot anyway.

The second relay lens 24 collects the light that diverges beyond the real image $i_1$ and recollimates that light into a beam which falls upon the third relay lens 26.

The third relay lens 26 is axially aligned with the second relay lens 24, and it projects the light through the field lens 28. Actually, the third relay lens 26 brings the collimated light from the second lens 24 into focus immediately beyond the field lens 28, producing a second real image $i_2$ at that location.

The field lens 28 is coaxial with the second and third relay lenses 24 and 26 and refracts the light such that it can pass through the relatively small initial elements of the wide angle lens 32. Indeed, the second folding mirror 30 reflects the light emerging from the field lens 28 into the wide angle lens 32, the axis of which coincides with that radius of the reflective surface 4 which passes through the aperture 10. That radius is of course the principal axis x of the optical system 16. The axis x when reflected from the mirror 30 also coincides with the common axis of the second and third relay lenses 24 and 26 and of the field lens 28.

The wide angle lens 32 includes (FIG. 3) several elements that are aligned along the axis x of the lens 32, and those elements enable the lens 32 to spread light into an extremely wide field which is a cone that is symmetrical about the axis x, its apex angle being about 130°. The rays for any given point on the raster pattern t again cross beyond the wide angle lens 32 to produce another real image $i_3$, but unlike the images $i_1$ and $i_2$, which are planar, the image $i_3$ is curved. Within the wide angle lens 32 is an aperture stop 36.

The aperture stop 36 forms a pupil $p_1$ which is within the lens 32 somewhat beyond the aperture stop 36. Considering the entire system of lenses 18, 20, 24, 26, 28 and 32, another pupil $p_2$ is formed at the entrance to the third relays lens 26 and still another pupil $p_3$ is located in the projector lens 18.

In addition to the lenses 20, 24, 26, 28 and 32 and the mirrors 22 and 30, the optical system 16 also includes a concave mirror 38 that is located outwardly from the wide angle lens 32 and the real image $i_3$ that it produces. The concave mirror 38, which has its reflective surface presented toward the wide angle lens 22 and the dome aperture 10 that is beyond the lens 32, is symmetrical about the principal optical axis x of the optical system 16. Moreover, its curvature is preferably that of an ellipsoid having one focus at the pupil $p_1$ within the wide angle lens 32, its other focus at the aperture 10 in the dome 2, and its major axis coinciding with the principal axis x of the optical system 16.

Ellipsoidal mirrors suitable for use as the concave mirror 38 are not easily procured, but spherical mirrors are, and a peripheral mirror is an acceptable substitute for an ellipsoidal mirror. If the reflective surface of the mirror 38 possesses a spherical configuration, then the mirror 38 should be positioned with its axis coinciding with the principal axis x of the optical system 16. Moreover, the center of curvature for the spherical mirror 38 should be between the pupil $p_1$ that is within the wide angle lens 32 and the aperture 10 in the dome 2. Also, the distance between the center of curvature and the curved image $i_3$ should be slightly less than the focal length of the spherical mirror 38, although the center of curvature for the image $i_3$ need not coincide precisely with the center of curvature for the mirror 38. In other words, it is important to have the image $i_3$ located slightly ahead of the principal focus of the mirror 38, that focus of course being located midway between the spherical reflective surface and the center of curvature, for when the image $i_3$ is so positioned it will eventually reform as another real image in front of the mirror 38. The pupil $p_1$, being offset from the center of curvature for the mirror 38, reforms as a conjugate focus which is at the aperture 10. As a consequence, the light will converge toward the aperture 10 and thereafter spread to be cast upon the portion of the diffuse reflective surface 4 that is opposite the aperture 10.

The concave mirror 38 may have other shapes such as a aspheric or parabolic, or perhaps even toric or cylindrical.

In any event, the concave mirror 38 and wide angle lens 32 are such that the aperture stop 36 within the lens 32 forms still another pupil $p_4$ in the optical system 16, this pupil being located at the aperture 10 in the dome 2. Thus, the pupil $p_1$ exists at one point along the prinpical axis x of the mirror 38, while the pupil $p_4$ exists at another point along the axis x, that other point being the conjugate focus of the first point insofar as the concave mirror 38 is concerned.

All of the light that leaves the wide angle lens 32 intercepts the concave surface of the mirror 38, from which it is reflected toward the aperture 10 of the dome 2. The light converges toward the aperture 10 and passes into the interior of the dome 2 through that aperture 10. Beyond the aperture 10, the light again spreads out into a cone which diverges enough to illuminate at least a hemisphere on the diffuse reflective surface A.

From the standpoint of a bundle of rays emanating from a particular point on the raster pattern t of the projector 14, those rays cross at the locations where the real images $i_1$, $i_2$ and $i_3$ are produced, the last being along an arc that lies intermediate the wide angle lens 32 and the concave mirror 38. Beyond the image $i_3$ the rays of the bundle diverge slightly, and are then reflected from the concave mirror 38, with the rays representing each point being quite close together and indeed almost parallel. As a consequence, they pass through the aperture 10 and into the interior of the dome 2. Actually the rays representing any one point on the raster pattern t are not truly parallel, but instead converge slightly, with the point of convergence being the diffuse reflective surface 4 of the dome 2. Thus, another and final real image $i_4$ is produced at the diffuse reflective surface 4. In short, the optical system 16 projects the raster pattern t in focus onto the diffuse reflective surface 4 and in so doing spreads the image through an angle wide enough to cover about a hemisphere on the surface 4.

Actually, some of the projected raster pattern t is lost in the shadow cast by the cockpit 6 and through the reduction of the projected field at the offset between the axes of the relay lenses 20 and 22, but these portions of the pattern t when projected as the image $i_4$ would not be visible to the pilot in the cockpit 6 anyway, so the absence of imagery in these areas does not detract from the simulated flight. Moreover, the image $i_4$ is inverted with respect to the image $i_3$. As a consequence the rays that are blocked by the tubular housing 34 and the wide angle lens 32 would, if continued, merely fall upon the cockpit 6 or its pedestal 8. In other words, the rays that are interrupted would not produce an image that would be visible to the pilot in the cockpit 6, so the fact that they are interrupted is of no real significance.

The operation of the projection system A, or more specifically the operation of its optical system 16, is best understood by tracing rays through it. In this regard, each point on the raster pattern t produces a bundle of rays which diverge and converge as they pass through the optical system 16. Wherever the rays from a single point intersect they produce a real image of that point. For example, a single point on the raster pattern t produces rays r, while another point produces rays s. The rays r emerge from the projector lens 18 in a generally collimated condition, and upon passing through the first relay lens 20, the rays 4 converge and intersect. The same holds true as to the rays s. The plane in which the rays r and s intersect is the real image $i_1$. Thereafter, the rays r and likewise the rays s diverge, and these diverging rays are reflected off of the first folding mirror 22 which directs them into the second relay lens 24. However, the second relay lens 24 has its optical axis offset from that of the first relay lens 20, with the offset being such that the upper portion of the raster pattern t is projected by the second relay lens 24, but not the bottom portion. The second relay lens 24 collects the diverging rays r and s that are reflected from the mirror 22 and recollimates them. The second lens 24 directs the collimated rays r and s to the third relay lens 26 which again brings the individual rays r and the individual rays s into convergence, casting them upon the field lens 28. Indeed, the rays r, and likewise the rays s, intersect immediately behind the field lens 28, forming the real image $i_2$. The field lens 28 refracts the rays r and s and directs them onto the second folding mirror 30, with the refraction being such that the rays r and s upon being reflected from the mirror 30 are accommodated by the relatively small initial lens element of the wide angle lens 32. The intensity of the illumination may be controlled by the aperture stop 36 within the wide angle lens 32.

The wide angle lens 32 directs the rays r and the rays s outwardly toward the concave mirror 38 with the rays r and s from different points on the pattern t being spread widely apart so that the raster pattern t, when considered as a whole, is spread generally over the entire surface area of the concave mirror 38. As to corresponding rays r or corresponding rays s from a single point on the raster pattern t, the wide angle lens 32 brings these rays r and s into convergence such that they intersect between the lens 32 and the mirror 38. Indeed, the intersection of the rays from all of the points lie along a spherical segment which is the real image $i_3$. The corresponding rays r and the corresponding rays s from a single point, thereafter diverge slightly from the image $i_3$ before reaching the surface of the concave mirror 38, from which they are reflected to the aperture 10 in the dome 2. The corresponding rays r upon reflecting off of the mirror 38 are almost parallel and indeed pass through the aperture 10 in that condition. Actually, the corresponding rays r converge slightly and intersect at the diffuse reflective surface 4 on the dome 2, thereby casting an image of the point, that image being part of the real image $i_4$. The corresponding rays s are intercepted by the housing 34 for the optical system, but would likewise converge and intersect at the reflective surface 4 if extended beyond the housing 34.

The rays representing most of the raster points behave similar to the rays r, that is they pass through the aperture 10 and converge at the reflective surface 4. However, different corresponding sets of rays intersect at different portions of the surface 4, and as a consequence practically an entire hemisphere of the surface 4 is illuminated, except of course for the area that lies in the shadow of the cockpit 6. Some of the rays, however, do not reach the cockpit 6 since they are interrupted by the tubular housing 34 that is in front of the mirror 38. Furthermore, the deleted bottom portion of the raster pattern t falls in the region of the pedestal 8 which is not observed by the pilot anyway.

Despite the fact that the aperture 10 on the dome surface 4 is quite small, the highly illuminated optical system 16 would nevertheless be quite visible were it not for the shadow of the wide angle lens 32 and an obscuration system 40 (FIG. 2). The obscuration system 40, in effect, produces an image that appears to be, at the aperture 10, as a continuation of a general scene or some other imagery that is cast onto the rear of the reflective surface 2. In short, the system 40 obscures the aperture 10.

The relatively large distance between the dome aperture 10 and the housing 34 of the optical system 16 provides ample room for incorporating the obscuration system 40 into the optical system 16. The obscuration system 40 includes a small diffuse reflective surface 42 that is located adjacent to the aperture 10, generally in the plane of the aperture 10. In addition, the obscuration system 40 includes a concave mirror 44, the reflective surface of which is presented toward the aperture 10 and the diffuse relative surface 42 located adjacent to that aperture 10. The concave mirror 44 is offset upwardly with respect to the major optical axis x of the catadioptric optical system 16 such that its lower edge is generally in front of the wide angle lens 32 and the mirror 30 that reflects into that lens, while the remainder of the mirror 44 is generally in front of that portion of the tubular housing 34 that lies in front of the mirror 32. Moreover, the mirror 44 is considerably smaller than the ellipsoidal mirror 38. Even so, the concave mirror 44 does interrupt some of the rays that reflect off of the ellipsoidal mirror 38, but those rays would, if continued through the aperture 10, merely be cast upon the cockpit 6 and therefore would not be available to illuminate the reflective surface 4 anyway. The construction and operation of obscuration systems are described in greater detail in U.S. Pat. No. 4,167,311.

The obscuration system 40 is used primarily to prevent the loss of imagery projected onto the rear surface 4 of the dome 2 by so-called target projectors 50. These projectors are usually located in the region of the pedestal 8 to provide simulated targets which must be intercepted or evaded during a simulated flight.

The target projectors 50 do not provide an overall scene on the diffuse reflective surface 4, and accordingly the rear portion of the surface 4 will remain blank unless illuminated by another projector. In other words, the image $i_4$ produced by the projector 14 through its optical system 16 covers generally the front, sides, and upper part of the reflective surface 4 as well as some of the lower surface. Imagery of this extent affords a very realistic flight simulation. However, additional imagery to the sides and rear of the cockpit 6 may be obtained by another projector 52 (FIG. 1) which is located in front and somewhat below the cockpit 6, generally in the shadow cast by the cockpit 6. The projector 52 projects imagery through a wide angle lens 54 that is exposed at the surface 4 of the dome 2, and the optical axis of the lens 54 may coincide with the optical axis x for the catadioptric optical system 16. In that case, the lens 54 is directly across the dome 2 from the aperture 10. As such, it is not illuminated by the image $i_4$ from the projector 14 and is further not seen by the pilot in the simulated cockpit 6. A catadioptric optical system similar to the optical system 16 may be used with the projector 52 in lieu of the single wide angle lens 54.

The optical system A produces the image $i_4$ directly in front of the cockpit 6, to the sides of the cockpit 6, and above the cockpit 6 so that the horizon ahead of and to the sides of the pilot are clearly visible for the simulated flight. Moreover, the image $i_4$ is produced with good resolution and very little distortion.

The wide angle projection system A, while being designed primarily for flight simulation, is useful for other applications requiring projection of wide angle fields of view. For example, it can be used for theater projection in the entertainment field and planitarium projection in the educational field, to name a few.

This invention is intended to cover all changes and modifications of the example of the invention herein chosen for purposes of the disclosure which do not constitute departures from the spirit and scope of the invention.

What is claimed is:

1. A wide angle projection system comprising: a projector capable of emitting light in a desired pattern; a concave mirror out of direct alignment with said projector; a system of lenses for directing the light emitted from the projector toward the mirror and for spreading that light widely as it is directed toward the mirror, the lens system causing the light to form a real image of the desired pattern beyond the lens system and at a substantial distance in front of the mirror, the lens system emitting the light at a location such that the light upon reflecting from the mirror converges along a stationary axis toward a small area and thereafter diverges and the mirror causing the light to form another real image of the desired pattern beyond the small area and in the region where the light diverges; and a surface positioned beyond the small area generally at the location at which the other real image of the desired pattern is formed in the diverging light so that the other real image is generally in focus on the surface.

2. A wide angle projection system comprising a projector capable of emitting light in a desired pattern; a concave mirror; a system of lenses for directing the light emitted from the projector toward said concave mirror and for spreading that light widely, the lens system emitting the light at a location such that the light upon reflecting from said concave mirror converges toward a small area and thereafter diverges; a wall having an aperture forming said small area toward which the light converges and passes through; and a surface positioned beyond said small area aperture at a location at which the image of the desired pattern is generally spherical in shape, and said wall in which the aperture lies is along the same spherical surface onto which the image is projected.

3. A projection system according to claim 2 wherein the lens system includes a wide angle lens that is located in front of the concave mirror.

4. A projection system according to claim 3 wherein the projector is located outside of the concave surface defined by the mirror.

5. A projection system according to claim 4, and further comprising: a simulated cockpit located generally between the small area and the surface on which the other real image comes into focus; and wherein the lens system includes a housing that extends in front of the concave mirror and blocks some of the light converging toward the small area, whereby a shadow is formed in the light diverging from the small area, the housing being located such that the shadow cast by it falls generally on the simulated cockpit.

6. A wide angle projection process, said process comprising producing light in a specific pattern; spreading the light from the pattern such that it forms a first real image of the pattern; conveying the light from the first real image to a second real image at some distance away from the first real image; conveying the light from the second real image to a third real image and upon a convergent mirror such that all of the light converges along a stationary axis to a small area and then diverges on passing through said small area to produce a fourth real image of the pattern as it diverges; and casting the light after it diverges onto a surface which is positioned generally at the fourth real image so that the pattern comes into focus on that surface.

7. A process according to claim 6 wherein the light is spread from one point along the axis of the mirror and the small area at which the reflected light converges is at the conjugate focus formed by that one point.

8. A process according to claim 7 wherein the light is spread toward the concave mirror by a wide angle lens.

9. A process according to claim 7 wherein the light is produced in the desired pattern laterally beyond the periphery of the concave mirror.

10. A projection system comprising: a concave mirror having an axis which intersects the mirror; a projector located beyong the mirror for producing a light pattern; means for transmitting the light of the pattern to the axis of the mirror; a wide angle lens having its axis coincident with the axis of the mirror and being positioned in front of the mirror to receive light from the means for transmitting the light and to project that light in a wide angle onto the concave mirror, the wide angle lens causing the light to form a real image of the light pattern beyond the lens and at a substantial distance in front of the mirror, the wide angle lens having a pupil which is positioned along the mirror axis such that upon light reflection from the mirror the pupil is reformed at a small area to which light from the mirror converges and thereafter diverges to form another real image of the light pattern beyond the small area, the small area also being located along the mirror axis; and a generally spherical surface facing the mirror and being positioned generally at the location where the other real image of the light pattern is formed so that the other image comes into focus on the surface; and said spherical surface is formed with an aperture located at the small area.

11. A projection system according to claim 10 and further comprising means for obscuring the aperture to one viewing the aperture from within the space enclosed by the spherical surface.

12. A projection system according to claim 10 wherein the real image of the light pattern between the lens and the mirror is curved and is also inverted with respect to the real image on the surface located beyond the mirror.

13. A projection system according to claim 12 and further comprising: a simulated cockpit mounted within the lower portion of space confined by the generally spherical surface, the cockpit being positioned such that the head of a pilot sitting within it will be located at about the center of curvature for the generally spherical surface; and wherein the means for transmitting the light of the pattern to the axis of the mirror includes a housing that extends in front of the concave mirror and blocks some of the light converting toward the small area at which the aperture in the generally spherical surface is located, whereby a shadow is formed in the light diverging from the small area, the housing being located such that the shadow cast by it falls generally on the simulated cockpit.

14. A wide angle projection system comprising: a projector capable of emitting light in a desired pattern; a concave mirror; a system of lenses for directing the light emitted from the projector toward the mirror and for spreading that light widely, the lens system emitting the light at a location such that the light upon reflecting from the mirror converges toward a small area and thereafter diverges, the lens system including several relay lenses, with the optical axis of one of the relay lenses being offset with respect to the optical axis of succeeding relay lenses that are optically aligned, the lens system further including a wide angle lens that is located in front of the concave mirror; a generally spherical surface positioned beyong the small area at a location at which the image of the desired pattern is generally in focus; and a wall having an aperture at the small area toward which the light converges, whereby the light reflected from the mirror passes through the aperture.

15. A projection system according to claim 10 and further characterized by the absence of the light refracting elements at the small area so that the light upon being reflected from the mirror passes substantially without being refracted to the surface.

16. A projection system according to claim 15 wherein the concave mirror is spherical and the wide angle lens is positioned such that the real image produced by it is between the center of curvature for the concave mirror and the principal focus for the mirror.

* * * * *

UNITED STATES PATENT AND TRADEMARK OFFICE
CERTIFICATE OF CORRECTION

PATENT NO. : 4,427,274

DATED : January 24, 1984

INVENTOR(S) : Marvin L. Pund and John A. VanHoogstrate, Jr.

It is certified that error appears in the above-identified patent and that said Letters Patent is hereby corrected as shown below:

Column 1, line 21, "ranges" should be "images".

Column 1, line 40, "conveyors" should be "converges".

Column 2, line 46, "surface to" should be "surface 4 to".

Column 2, lines 50 and 51, "surface 2" should be "surface 4".

Column 5, line 33, "surface A" should be "surface 4".

Column 10, Claim 13, line 19, "converting" should be "converging".

Signed and Sealed this

Twenty-fourth Day of April 1984

[SEAL]

Attest:

GERALD J. MOSSINGHOFF

Attesting Officer     Commissioner of Patents and Trademarks